Patented July 22, 1952

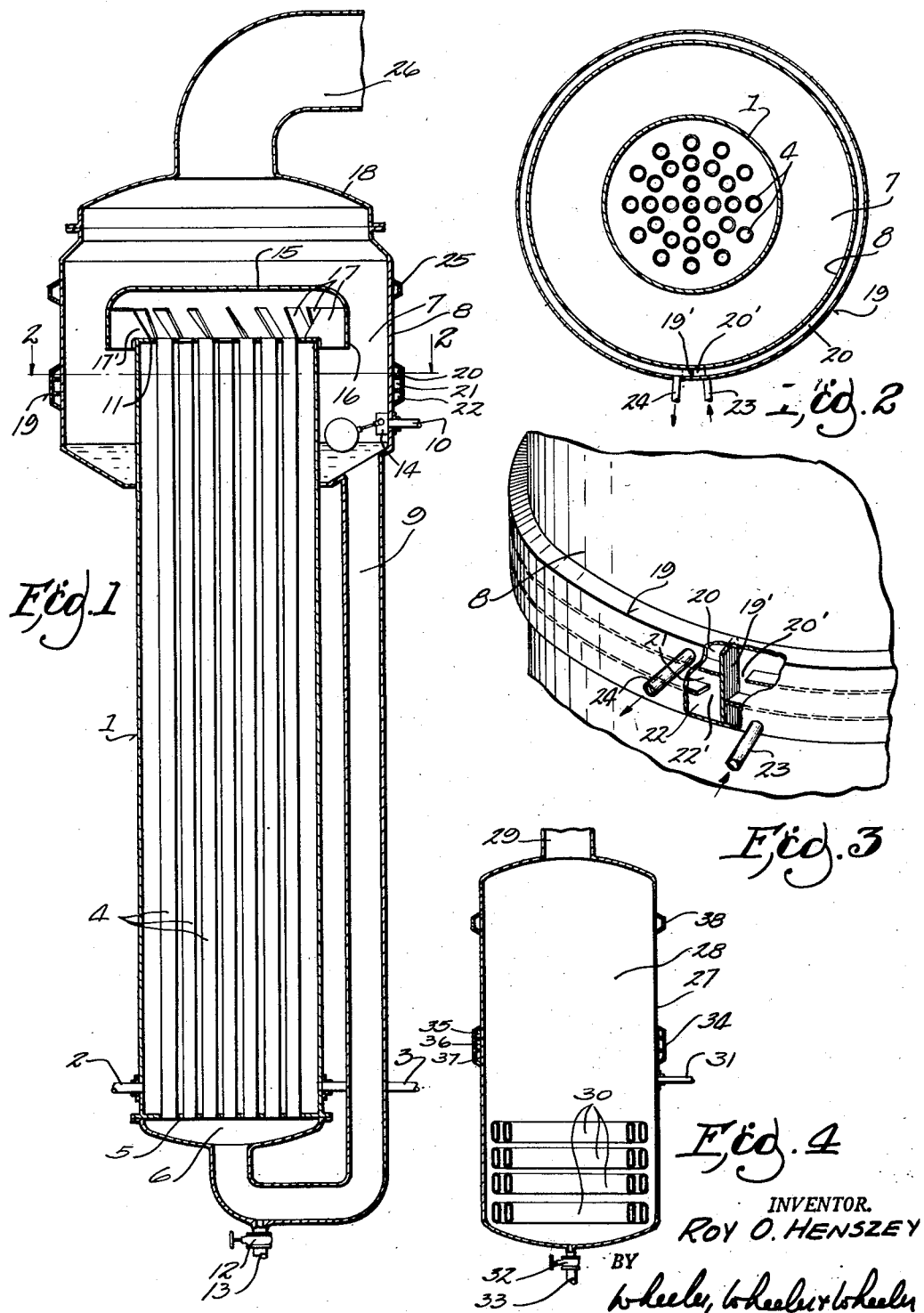

2,604,154

UNITED STATES PATENT OFFICE 2,604,154

APPARATUS AND METHOD FOR CONTROLLING FOAM

Roy O. Henszey, Oconomowoc, Wis.

Application October 5, 1946, Serial No. 701,558

11 Claims. (Cl. 159—27)

This invention relates to an apparatus and method for controlling the foam level above a liquid and particularly above milk, the present application being a continuation in part of my application entitled Apparatus and Means for Controlling Foam, Serial Number 592,758, filed May 9, 1945, now abandoned.

It is a general object of the present invention to provide apparatus for limiting the height to which foam may rise. Another object is to provide apparatus adapted to limit the rise of a foam engendered as an incident to vaporizing a liquid by the application of heat thereto. A further object is to provide efficient apparatus for evaporating liquids, and particularly milk, wherein a portion of the liquid is removed in the form of a vapor which is relatively free of entrained liquid.

A more particular object is to provide a sanitary means whereby the level of foam engendered over milk on evaporating the latter in a retort may be kept at or below a pre-determined level which is well below the top of the retort, thereby providing a foam-free space in which vapor being withdrawn from the apparatus may be separated from any liquid particles entrained in the vapor, this separation being effected either by gravity or by gravity together with centrifuge means. It is desired to accomplish the foregoing object without introducing foam-controlling apparatus into the retort since the cleaning of milk-handling apparatus is always a problem, and a very important feature of the present invention is the control of foam by means entirely external, whereby the control does not involve any additional structure to be cleaned.

It is also an object of the present invention to provide an improved method for controlling the level of a foam rising above a liquid.

The nature of these and other objects of the present invention become more apparent from a consideration of the following description and appended claims, together with the accompanying drawing.

I have discovered that the level of foam engendered above a liquid in a given vessel, as on the application of heat to the liquid to promote vaporization thereof, may be arrested at any pre-determined level above the liquid by applying a coolant at said level to the outer surface of the vessel. This may conveniently be accomplished by providing the vessel with a full or partial jacket embodying a coolant passage communicating with suitable coolant inlet and outlet connections. The lowest level of the coolant in the jacket determines the approximate level at which any foam rising in the vessel will be arrested.

While other types of coolant devices have been employed to control foam levels above a liquid, such devices have been exposed directly to the foam. This is a disadvantage, especially when dealing with apparatus which must be cleaned and otherwise maintained in a sanitary condition, as with that employed in processing milk. The coolant means employed in the present invention does not contact the foam or the milk in the vessel except as the wall of the latter acts to cool adjacent bubbles of foam, and therefore no additional equipment which must be cleaned is utilized.

Further, the known types of foam controlling devices have achieved their desired end only by chilling the foam area across the entire section of the vessel. This not only makes for more difficult and extended cleaning of the apparatus, but impairs the efficiency of any thermal evaporating unit. I have discovered that no such extensive chilling is required, and that a cool area relatively small as compared with the surface or volume to be controlled suffices to arrest a foam at the chilling point. As the foam rises from the surface of the liquid being heated, it will ultimately contact the cool wall portion of the vessel. The foam bubbles contacting the cool wall portion collapse or break, and other bubbles tending to rise above the said portion will thereupon flow by gravity toward the cool wall where, in turn, they are broken. I have discovered that however restricted the coolant area, apparatus incorporating the present invention will tend to prevent the foam from rising substantially above the cooled wall level at any point within the vessel.

The greater the temperature differential between the coolant and the foam, the smaller may be the chilling, or cold area. It is preferred that this temperature differential be approximately 50° F. Assuming the foam to be at a temperature of approximately 180° F., the entering water or other coolant should not be above 130° F. Since water at temperatures lower than 130° F. is available almost everywhere, no artificial refrigeration will be necessary in the normal practice of my invention. For example, in a milk evaporator having a free liquid surface of 12 sq. feet and having 480 sq. feet of heat surface which causes boiling at 140° to 190° F., I use a coolant jacket which cools a wall surface in the interior of the vessel having a peripheral area of about 4 sq. feet. Water may enter the jacket at a temperature of about 60° F. and leaves the jacket at about 130° F., the water flowing at a rate of from about 1 to 3 gallons per minute. The heat loss in using such an organization continuously has been found to be about 1 or 2 per cent, and almost nothing when foaming must only occasionally be suppressed.

While in its general aspects the invention here disclosed is not restricted to use with any particular foam or liquid material, the invention finds particular application when associated with milk evaporators, and especially with milk evaporators designed to handle large milk volumes with relatively small apparatus. Accordingly, the devices embodying the present invention which are illustrated in the accompanying drawing are those which find utility in evaporating milk and milk products.

In the drawings:

Fig. 1 is a view in vertical axial section through a combined evaporator and separator embodying the present invention.

Fig. 2 is a cross sectional view taken along the line 2—2 in Fig. 1.

Fig. 3 is a detail view in perspective, on an enlarged scale, of a portion of the apparatus shown in Fig. 1, the wall being broken away to show interior coolant passages.

Fig. 4 is a view in vertical axial section through a modified form of evaporator embodying the features of the present invention.

The evaporator illustrated in Figs. 1–3 comprises a tubular vessel 1 into which steam or other fluid used for heating may be admitted at 2, and from which condensate may be delivered at 3. Within the jacket 1 are tubes 4 which are preferably vertical, leading straight upward from the header 5, beneath which said tubes communicate with a chamber 6 for a liquid, as for example milk, to be evaporated.

Surrounding the upper end of the vessel 1 is a chamber 7 into which tubes 4 open. The chamber has a wall 8 and communicates by means of the pipe 9 with chamber 6. Liquid to be evaporated is supplied to chamber 7 in any convenient manner, as through the pipe 10, passing downwardly through pipe 9 and into the chamber 6, from whence it flows upwardly through the tubes 4 which open upwardly through a header 11. The evaporated milk may be withdrawn from chamber 6 through valve 12 and pipe 13. A float-operated valve 14 is employed to maintain the desired liquid level within the chamber 7.

Steam or vapor is generated within the liquid as the latter progresses upwardly through tubes 4. This lightens the mixture of liquid and vapor in tubes 4, and the unbalance of the weight of this mixture and the pressure due to the solid body of liquid in the downgoer pipe 9 causes the mixture in the tubes 4 to develop considerable velocity with continued upward movement. Accordingly, both liquid and vapor are discharged at the top of tubes 4 with sufficient momentum to strike against an umbrella-shaped baffle 15, and from there to flow along the under side of the baffle and its outer edge 16, where the liquid is discharged in a series of streams which are delivered in a direction both downward and nearly tangential with respect to the baffle 15.

Beneath the overhanging and downwardly curved margin, or edge 16 of the baffle 15 are a series of vanes 17 which are encountered by the liquid as it tends to issue radially from beneath the baffle. These vanes are preferably all curved in the same direction, here illustrated as counter-clockwise in plan. The vanes 17 serve as guide means, and together with the overhanging margin 16 of the umbrella-shaped baffle 15 intercept and give direction to the liquid intercepted by the baffle, as well as to the vapor. The liquid tends to be discharged in separate streams between adjacent vanes along associated edge portions of the baffle, and the vapor escapes between such streams whereupon it assumes a rotary, whirling motion about the umbrella within the chamber 7. The arrangement may be that described in more detail in my companion application No. 606,097 filed July 20, 1945, now Patent No. 2,512,938, issued June 27, 1950. As the vapor escapes, it preserves its whirling motion as it rises to the upper portion of chamber 7 and is drawn out through an outlet 26, normally by a suction device inducing a partial vacuum in the evaporator. This centrifuging or cyclone action of the vapor causes substantially all liquid entrained in the vapor to be thrown against the side wall 8 of the chamber, from where the liquid released by the vapor drains down to join the main body of liquid.

The cover 18 on chamber 7 is preferably made large enough so that the entire baffle 15 and its depending vanes 17 may be lifted out of the evaporator for cleaning or other purposes. Some of the curved vanes 17 are provided along their inner margin with extensions 17' which engage the outer peripheral portions of the header 11, and thereby support the entire baffle structure in a readily removable position on top of the header.

Mounted about the outer surface of wall 8, at a position above the level of the liquid normally contained in chamber 7, and below edge 16 of the baffle 15, is an annular jacket 19. This jacket, which also serves as a stiffener ring, incorporates coolant passages which are here three in number as shown at 20, 21 and 22. A partition 19' and communicating ports 20' and 22', alternately on opposite sides of partition 19' (Fig. 3) provide for coolant flow through the three passages in series. A coolant inlet 23 communicates with the passage 22, while passage 20 is provided with an outlet 24 for the coolant.

Apparatus of the type here described is customarily fabricated of relatively expensive materials, as stainless steel. In the interests of economy, the walls provided are made as thin as possible, and with the aid of a stiffening ring, as the jacket 19, a thin-walled structure is given the necessary strength and rigidity. Ordinarily such a stiffener ring as that indicated at 25 is used, such ring having no other function.

Particularly in the early stages of evaporation, relatively large volumes of foam are formed in chamber 7, and while the falling liquid discharged from baffle 15 acts somewhat as a foam depressant, the foam in some cases rises to an unduly high level. Inasmuch as the vapor phase engendered by heating the milk or other liquid must escape upwardly through chamber 7 after passing out from beneath the baffle edge 16, it is imperative that the foam level be maintained well below the baffle edge if the escaping vapor is not to entrap liquid particles present in the foam and so carry them out through the discharge outlet 26 at the top of chamber 7. When such liquid loss occurs, the efficiency of the unit drops off rapidly, and therefore the vapor should be drawn off with as little liquid therein as possible. When a cyclone type of evaporator is used, as that illustrated in Figs. 1–3, it is particularly important to maintain the foam level below the centrifuge unit, or baffle 15 and its associated structure, for were the foam level to rise thereabove, the escaping whirling vapor would pick up relatively large quantities of foam, and in the comparatively small space between the top of the baffle and the outlet 26, the escaping vapor would not have sufficient room in which to free itself of the entrained liquid foam particles.

I have found that the upper level of the foam engendered above the liquid present in chamber 7 may be kept well below the baffle edge 16 by positioning the coolant jacket below the said edge. While a series of coolant passages 20, 21, 22 may be provided as shown in the jacket 19, the foam is in fact normally arrested at the level of the lower coolant passage 22, the other passages being provided more or less as a safety feature. In this manner there is at all times provided a foam-free space in the upper portion of chamber 7, this space extending from a point well below the level of the baffle edge 16 to the top of the vessel. Under these conditions vapor escaping through the outlet does not carry with it the particles of liquid which would otherwise have been gathered from the foam were the level of the latter not controlled in the manner here described.

The passage may have greatly less than 360° of extent, but there is no advantage in limiting its arcuate extent where it also serves as a reenforcement.

In Fig. 4 I have disclosed a modified form of evaporator which comprises a wall 27 enclosing a chamber 28 provided at its top with a vapor outlet 29. Disposed within the lower portion of chamber 27 are heating coils 30 adapted to receive steam or other heating fluid. The liquid to be heated passes into the vessel through inlet pipe 31 and is discharged through valve 32 and outlet 33. An annular jacket 34 is mounted about a mid-portion of the outer wall of the evaporator, the jacket being provided with connecting coolant passages 35, 36 and 37. Passages 35 and 37 are respectively provied with suitable coolant inlet and outlet means (not shown) of the type illustrated in Fig. 3. The jacket 34 may also serve as a stiffener ring, thereby permitting wall 27 to be fabricated of metal of a relatively thin gauge. Additional stiffener rings of the type shown at 38 may also be used if desired.

In the apparatus illustrated in Fig. 4 the liquid particles which become entrained in the rising vapor become separated therefrom by gravity as the vapor passes upwardly through the vessel and is discharged through outlet 29. However, separation of liquid from the vapor in this manner requires that the upper portion of the evaporator be maintained in a foam-free condition, and this is accomplished by mounting the coolant jacket about a mid-portion of the evaporator, i. e., above the level of liquid normally contained in the vessel but well below the top of the vessel. The foam is arrested substantially at the level of the lower coolant passage 37. In an apparatus of this character, a much deeper space must be provided between the upper level of the foam and the top of the evaporating vessel than is the case with an evaporator which incorporates a centrifuge, vapor-liquid separating unit.

It is apparent that both types of apparatus illustrated are well adapted to the processing of fluid milk, and that the problem of cleaning the apparatus and maintaining the same in a sanitary condition is in no wise aggravated by the provision of the coolant jackets 19, 34. The interior wall portions of the vessel adjacent the jacket are entirely smooth and unobstructed. Further, both types of apparatus provide a relatively large foam-free space in the upper portion of the vessel without materially impairing the efficiency of the apparatus. Indeed, what heat loss does occur by reason of a limited cooling of the foam may be recovered in large part by employing the discharged and heated coolant liquid to preheat the milk or other liquid to be evaporated.

I claim:

1. In a method for evaporating a liquid in a vertically walled vessel under conditions such that foaming results and including the steps of heating the liquid in a heating zone to vaporize the same, separating the liquid particles from the vapor in a separating zone and withdrawing substantially all the vapor from the separating zone, the intermediate step of breaking the foam by cooling the wall of the vessel in a cooling zone between the heating zone and the point where vapor is withdrawn from the separating zone, said cooling zone being materially removed from the point of foam generation so as to not to interfere with vaporization of the liquid.

2. The method of claim 1 in which the cooling zone is also spaced from said separating zone sufficiently to preclude condensation of vapor other than that present in the foam.

3. The method of claim 1 in which the wall is cooled to about 50 degrees lower temperature than the foam.

4. In an evaporator arranged to evaporate water from a liquid containing suspended solids and from which foam is generated incidentally to evaporation, the combination with means for maintaining a liquid level in the evaporator, of heating means in a lower portion of the evaporator for vaporizing said liquid, of cooling means on a vertical side wall of the evaporator above the said liquid level and above the highest point of foam generation, and means in the evaporator above said cooling means for separating liquid particles from the vapor, said last-named separating means comprising a substantial vapor-receiving space permitting gravity separation of the vapor from liquid entrained therein, said vapor-receiving space being sufficiently above said cooling means so as not to be cooled thereby.

5. In an evaporator arranged to receive a liquid to be evaporated in its lower portion, the combination with heating means for said liquid, and cooling means on a vertical side wall above the maximum level of liquid normally contained in the evaporator, there being a substantial vapor-receiving space in the evaporator above said cooling means, which space permits gravity separation of the vapor from liquid entrained therein, centrifuge means positioned above said cooling means but below the top of the evaporator, there being a vapor-receiving space above said centrifuge means permitting separation of the vapor from liquid entrained therein by both gravity and centrifugal action.

6. In an evaporator having a jacket closed by a tube sheet and tubes opening therethrough into a chamber provided with vapor dome and sump, the combination with an umbrella-shaped baffle positioned to intercept liquid ejected from the tubes, of guide fins mounted on said baffle, and of cooling means disposed about the outer wall of said chamber below the level of said baffle, said cooling means being adapted to cool adjacent portions of the chamber wall and to maintain the foam level in the chamber below said baffle, said guide fins being obliquely disposed and having the upper portion of each overlying and spaced from the lower portion of another whereby said fins intercept liquid being discharged from the baffle and form said liquid into streams.

7. In an evaporator having a jacket closed by a tube sheet and tubes opening therethrough into a chamber provided with vapor dome and sump, the combination with an umbrella-shaped baffle position to intercept liquid ejected from the tubes, of guide fins mounted on said baffle, and of cooling means disposed about the outer wall of said chamber below the level of said baffle, said cooling means being adapted to cool adjacent portions of the chamber wall and to maintain the foam level in the chamber below said baffle, wherein said baffle has a depending skirt on which said fins are mounted in positions inclined to the vertical, said guide fins having the upper portion of each overlying and spaced from the lower portion of another whereby said fins intercept liquid and vapor being discharged from beneath the baffle and form the liquid into streams and impart a whirling motion to the vapor, particles of liquid entrained in the vapor being separated from the latter in part by centrifugal action as the whirling vapor passes upwardly around the baffle and is withdrawn from the evaporator.

8. In an evaporator having a jacket closed by a tube sheet and tubes opening therethrough into a chamber provided with vapor dome and sump, the combination with an umbrella-shaped baffle positioned to intercept liquid ejected from the tubes, of guide fins mounted on said baffle, and of cooling means disposed about the outer wall of said chamber below the level of said baffle, said cooling means being adapted to cool adjacent portions of the chamber wall and to maintain the foam level in the chamber below said baffle, said cooling means comprises an annular stiffening ring disposed about the periphery of the chamber wall, said ring being provided with a coolant passage.

9. In an evaporator comprising a jacket having a tube sheet, tubes extending through the jacket and opening through said tube sheet, and a chamber into which said tubes open and providing a sump and a vapor dome and having a vapor outlet, the combination with an umbrella-shaped baffle overlying the tube sheet and of larger area than said tube sheet, said baffle having a skirt depending marginally therefrom, of a cooling means mounted on the outer wall surface of said chamber at a position below the level of said skirt.

10. In an evaporator comprising a jacket having a tube sheet, tubes extending through the jacket and opening through said tube sheet, and a chamber into which said tubes open and providing a sump and a vapor dome and having a vapor outlet, the combination with an umbrella-shaped baffle overlying the tube sheet and of larger area than said tube sheet, said baffle having a skirt depending marginally therefrom to a level adjacent the level of said tube sheet and spaced outwardly therefrom, said skirt being provided along its inner margin with spaced fins inclined to the vertical and having their upper ends respectively overlying and spaced from the lower ends of adjacent fins for intercepting and channelling in streams the flow of liquid accumulating within the baffle, and of a cooling ring jacket mounted on the outer wall surface of said chamber at a position below the level of said skirt.

11. The combination set forth in claim 10, in which the skirt comprises a substantially continuous wall, said fins extending inwardly from said skirt into the path of liquid flowing from said baffle downwardly about said jacket, and the cooling jacket comprises a stiffener ring mounted about said chamber wall, said stiffener ring being provided with a coolant passage and with inlet and outlet means communicating with said passage.

ROY O. HENSZEY.

REFERENCES CITED

The following references are of record in the file of this patent:

UNITED STATES PATENTS

| Number | Name | Date |
|---|---|---|
| 3,749 | Rowland | Sept. 17, 1844 |
| 14,334 | Webb | Feb. 26, 1856 |
| 521,946 | Cooper | June 26, 1894 |
| 521,974 | Cooper | June 26, 1894 |
| 522,416 | Iles | July 3, 1894 |
| 669,862 | Shimer | Mar. 12, 1901 |
| 863,031 | Lehnert | Aug. 13, 1907 |
| 971,258 | Dunn | Sept. 27, 1910 |
| 989,996 | Parker | Apr. 18, 1911 |
| 1,028,737 | Kestner | June 4, 1912 |
| 1,067,010 | Dunn | July 8, 1913 |
| 1,250,094 | Cozzolino | Dec. 11, 1917 |
| 1,511,435 | Yates | Oct. 14, 1924 |
| 1,762,493 | Watrous | June 10, 1930 |
| 1,783,813 | Schneible | Dec. 2, 1930 |
| 2,091,187 | Savage | Aug. 24, 1937 |
| 2,106,589 | Bigger et al. | Jan. 25, 1938 |
| 2,223,595 | Blakeslee | Dec. 3, 1940 |
| 2,287,995 | Haugh | July 30, 1942 |
| 2,305,166 | Koch | Dec. 15, 1942 |
| 2,512,938 | Henszey | June 27, 1950 |
| 2,537,346 | Henszey | Jan. 9, 1951 |

FOREIGN PATENTS

| Number | Country | Date |
|---|---|---|
| 15,257 | Great Britain | July 2, 1907 |
| 440,770 | Great Britain | Jan. 6, 1936 |